(12) United States Patent
Sheu

(10) Patent No.: US 9,014,560 B2
(45) Date of Patent: Apr. 21, 2015

(54) OPTICAL TRANSMISSION SYSTEM INCLUDING OPTICAL EMITTING DEVICE AND OPTICAL RECEIVING DEVICES

(71) Applicant: Hon Hai Precision Industry Co., Ltd., Tu-Cheng, New Taipei (TW)

(72) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 281 days.

(21) Appl. No.: 13/626,901

(22) Filed: Sep. 26, 2012

(65) Prior Publication Data

US 2013/0315581 A1    Nov. 28, 2013

(30) Foreign Application Priority Data

May 25, 2012  (TW) .............................. 101118644 A

(51) Int. Cl.
    *H04B 10/20*     (2006.01)
    *H04J 14/00*     (2006.01)
    *H04B 10/278*    (2013.01)

(52) U.S. Cl.
    CPC .................................. *H04B 10/278* (2013.01)

(58) Field of Classification Search
None
See application file for complete search history.

(56) References Cited

U.S. PATENT DOCUMENTS 4,671,608 A * 6/1987 Konishi ......................... 385/24
5,502,589 A * 3/1996 Yamamoto et al. ............ 398/180

\* cited by examiner

*Primary Examiner* — Ken Vanderpuye
*Assistant Examiner* — Merlin Brito Peguero
(74) *Attorney, Agent, or Firm* — Novak Druce Connolly Bove + Quigg LLP

(57) ABSTRACT

An optical transmission system includes an optical emitting device and a plurality of optical receiving devices. The optical receiving devices are optically connected in series and one of the optical receiving devices is optically connected to the optical emitting device. Each of the optical receiving devices includes a control module, an optical receiving terminal, and an optical fiber amplifier. The optical emitting device emits out first optical signals or second optical signals. The control module transmits the first optical signals to the optical receiving terminal or transmits the second optical signals to the optical fiber amplifier. The optical fiber amplifier amplifies the second optical signals and sends the amplified second optical signals to the next optical receiving device.

3 Claims, 3 Drawing Sheets

OPTICAL TRANSMISSION SYSTEM INCLUDING OPTICAL EMITTING DEVICE AND OPTICAL RECEIVING DEVICES

BACKGROUND

1. Technical Field

The present disclosure relates to an optical transmission system.

2. Description of Related Art

An optical transmission system typically includes an optical emitting device, a photoelectric conversion device connected to the optical emitting device, and a number of terminals connected to the photoelectric conversion device. The photoelectric conversion device converts optical signals emitted from the optical emitting device into electrical signals and sends the electrical signals to the corresponding terminal. However, because of the limited capacity of the photoelectric conversion device, only a limited number of terminals can be connected to the photoelectric conversion device.

Therefore, an optical transmission system which can overcome the above-mentioned problems is needed.

BRIEF DESCRIPTION OF THE DRAWINGS

FIG. 2 is a schematic view of one of the control modules of FIG. 1, wherein the control module is in a state of letting the optical signals passing through.

DETAILED DESCRIPTION

Figure 1:
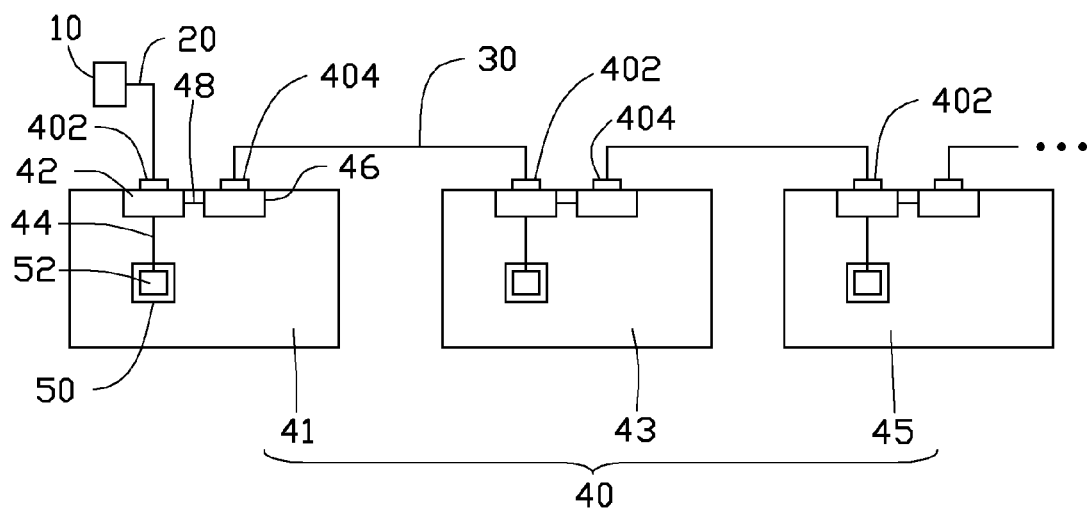
FIG. 1 is a schematic view of an optical transmission system according to an exemplary embodiment, the optical transmission system including a number of control modules.

FIG. 1 shows an optical transmission system 100 according to an exemplary embodiment. The optical transmission system 100 includes an optical emitting device 10, a first optical fiber 20, a number of second optical fibers 30, and a number of optical receiving devices 40. In the embodiment, the optical emitting device 10 is a laser diode. The optical receiving devices 40 include a first optical receiving device 41, a second optical receiving device 43, and a third optical receiving device 45.

Each of the optical receiving devices 40 includes an input port 402, an output port 404, an optical receiving terminal 50, a control module 42, a third optical fiber 44, a fourth optical fiber 48, and an optical fiber amplifier 46.

The input port 402 of the first optical receiving device 41 is connected to the optical emitting device 10 via the first optical fiber 20. Each two adjacent optical receiving devices 40 are connected to each other via one of the second optical fibers 30. In the embodiment, the output port 404 of the first optical receiving device 41 is connected to the input port 402 of the second optical receiving device 43 via one of the second optical fibers 30. The output port 404 of the second optical receiving device 43 is connected to the input port 402 of the third optical receiving device 45.

In each optical receiving device 40, the control module 42 is connected to the input port 402. The optical receiving terminal 50 may be a display, sound equipment, or a Digital Video Disc player (DVD player). The optical receiving terminal 50 is connected to the control module 42 via the third optical fiber 44. The optical fiber amplifier 46 is connected to the control module 42 via the fourth optical fiber 48, and is further connected to the output port 404. Each optical receiving terminal 50 includes a photoelectric conversion unit 52. The photoelectric conversion unit 52 is used to convert optical signals transmitted by the control module 42 to electrical signals.

Figure 2:
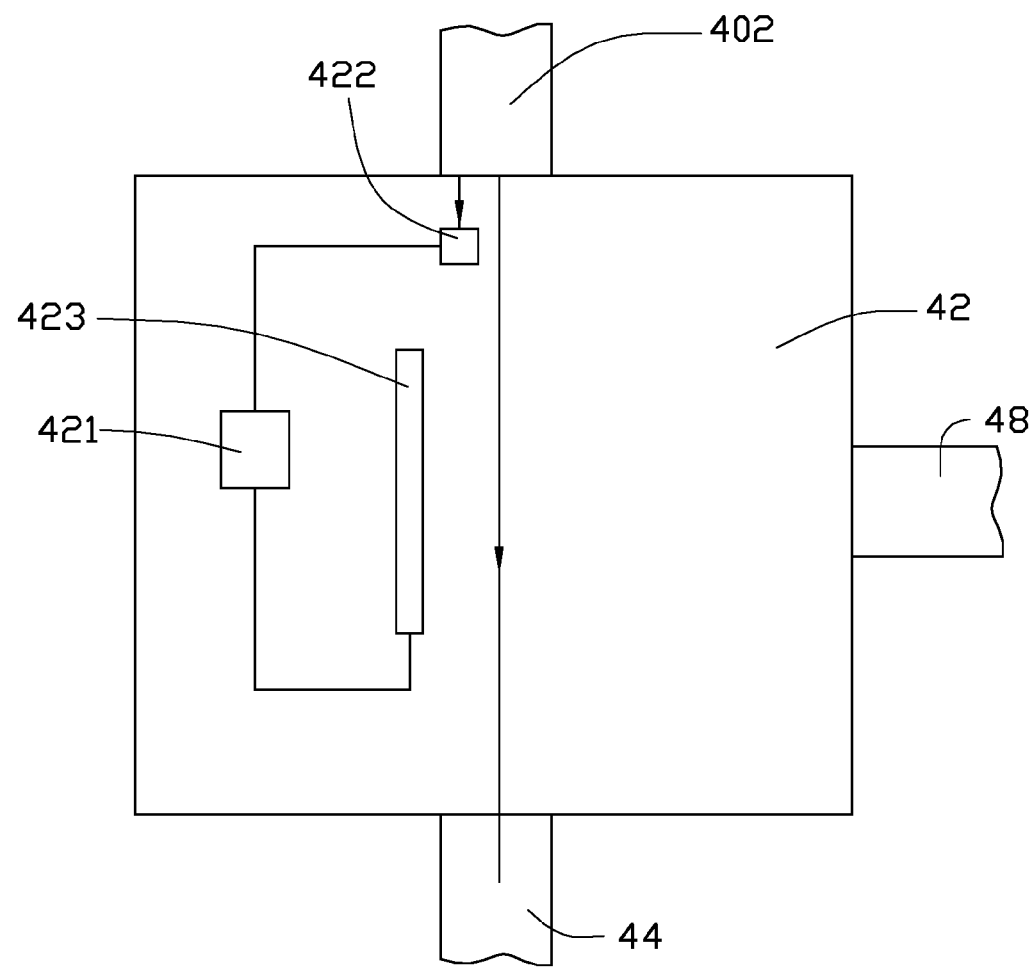
Figure 3:
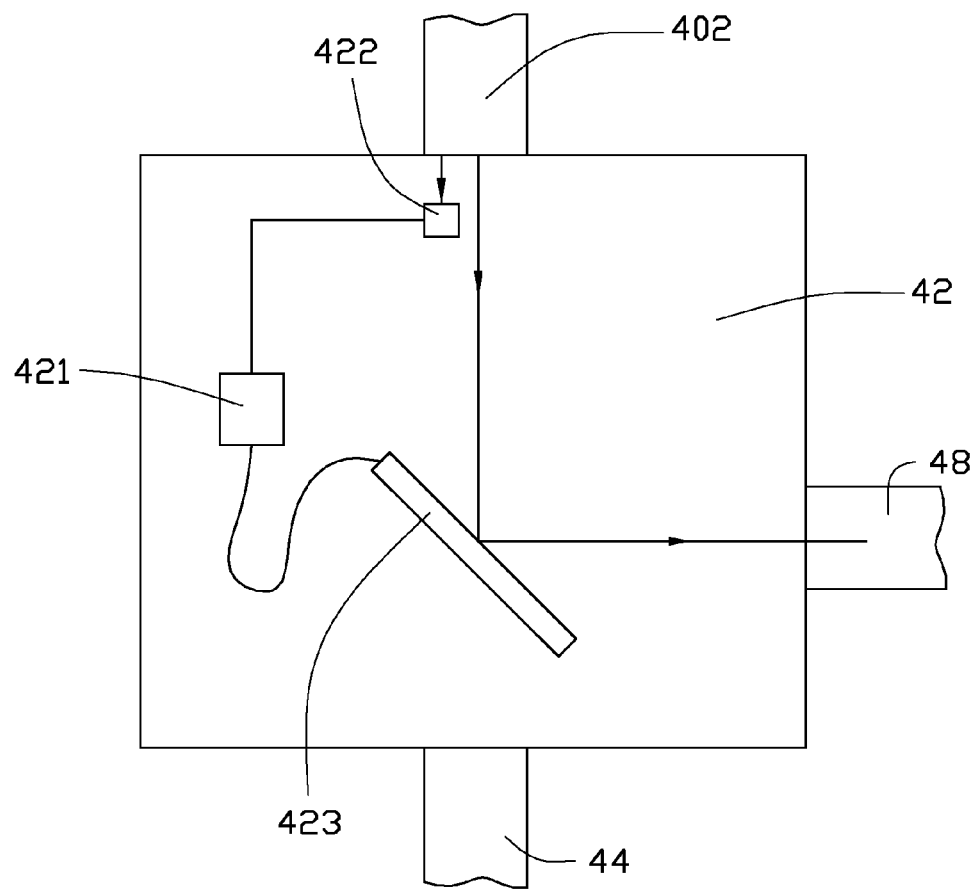
FIG. 3 is similar to FIG. 2, except that the control module is in a state of reflecting the optical signals.

Referring to FIGS. 2 and 3, each control module 42 includes a controller 421, a signal analyzer 422, and a reflector 423. The signal analyzer 422 and the reflector 423 are connected to the controller 421. The signal analyzer 422 stores a receiving address.

When working, optical signals emitted by the optical emitting device 10 are transmitted by the first optical fiber 20, the input port 402 of the first optical receiving device 41, and are received by the control modules 42 of the first optical receiving device 41. The optical signals include address information. The signal analyzer 422 compares the address information with the receiving address stored in the signal analyzer 422. When the address information is consistent with the receiving address, the signal analyzer 422 treats the optical signals as first optical signals, the first optical signals pass through the control module 42 and reach the optical receiving terminal 50, and the photoelectric conversion unit 52 converts the first optical signals into electrical signals. When the address information is inconsistent with the receiving address, the signal analyzer 422 treats the optical signals as second optical signals and sends a starting signal to the controller 421, the controller 421 drives the reflector 423 to rotate, the reflector 423 reflects the second optical signals to the fourth optical fiber 48. The optical fiber amplifier 46 receives the second optical signals from the fourth optical fiber 48, amplifies the second optical signals, and sends out the amplified second optical signals from the output port 404. The second optical receiving device 43 receives the amplified second optical signals, and processes the amplified second optical signals in a way similar to the first optical receiving device 41, for example.

The optical receiving device 40 are connected in series and each of the optical receiving device 40 includes an optical receiving terminal 50. In this way, an infinite number of optical receiving terminals 50 can be added into the optical transmission system 100.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An optical transmission system, comprising:

an optical emitting device configured for emitting optical signals, the optical signals being first optical signals and second optical signals;

a first optical fiber;

a plurality of second optical fibers; and a plurality of optical receiving devices, each of the optical receiving devices comprising:

an input port, the input port of one of the optical receiving devices being connected to the optical emitting device via the first optical fiber;

an output port, the output port of one of the optical receiving devices being connected to the input port of another of the optical receiving devices via one of the second optical fibers;

a control module connected to the input port;

a third optical fiber;

a fourth optical fiber;
an optical receiving terminal connected to the control module via the third optical fiber; and
an optical fiber amplifier connected to the control module via the fourth optical fiber and connected to the output port; wherein the control module comprises a controller, a signal analyzer, and a reflector, the signal analyzer and the reflector are connected to the controller, the signal analyzer stores a receiving address, the optical signals emitted by the optical emitting device comprise an address information and are received by the input port, the signal analyzer compares the receiving address with the address information, when the address information is inconsistent with the receiving address, the signal analyzer regards the optical signals as the first optical signals, the first optical signals pass through the control module and are received by the optical receiving terminal via the third optical fiber, when the address information is inconsistent with the receiving address, the analyzer regards the optical signals as the second optical signals and sends a starting signal to the controller, the controller controls the reflector to rotate according to the starting signal, and the reflector reflects the second optical signals to the fourth optical fiber and then in turn to the optical fiber amplifier, the optical fiber amplifier is configured for amplifies the second optical signals and sending the amplified second optical signals to the output port.

2. The optical transmission system of claim 1, wherein the optical receiving terminal comprises a photoelectric conversion unit, and the photoelectric conversion unit is configured for converting the first optical signals into electrical signals.

3. The optical transmission system of claim 1, wherein the optical receiving terminal is one selected from the group consisting of a display device, a sound equipment, and a DVD player.

* * * * *